(12) United States Patent
Kreiner

(10) Patent No.: US 7,914,725 B2
(45) Date of Patent: Mar. 29, 2011

(54) END DISK

(75) Inventor: Anton Kreiner, Reisbach (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 12/852,011

(22) Filed: Aug. 6, 2010

(65) Prior Publication Data

US 2011/0005671 A1    Jan. 13, 2011

Related U.S. Application Data

(62) Division of application No. 12/064,674, filed as application No. PCT/EP2006/065622 on Aug. 24, 2006, now abandoned.

(30) Foreign Application Priority Data

Aug. 25, 2005  (DE) .................. 10 2005 040 417

(51) Int. Cl.
*B29C 67/00*  (2006.01)

(52) U.S. Cl. .......... 264/493; 264/492; 264/405; 156/69; 156/272.2; 156/379.6

(58) Field of Classification Search .................. 264/405, 264/413, 478, 492, 493, 481; 156/60, 69, 156/272.2, 379.6; 428/38
See application file for complete search history.

(56) References Cited

U.S. PATENT DOCUMENTS

2005/0194308 A1* 9/2005 Rohrmeier et al. ........... 210/490
* cited by examiner

*Primary Examiner* — Joseph S Del Sole
*Assistant Examiner* — David N Brown, II
(74) *Attorney, Agent, or Firm* — James Hasselbeck

(57) ABSTRACT

A plastic end disk for a hollow-cylindrical filter element has an end face plastic layer and a neighboring plastic layer. The end face plastic layer is transparent for infrared radiation. The neighboring plastic layer is absorbent for infrared radiation. The plastic end disk is connected to a folded filter medium in that the end face plastic layer is trans-irradiated with an infrared radiation source, wherein the infrared radiation is absorbed in the neighboring plastic layer so that a portion of the neighboring plastic layer and a portion of the end face plastic layer are completely melted. The infrared radiation source is removed and the filter medium is pressed into a melted area of the end face plastic layer. The filter medium is secured in the pressed-in position in the end face plastic layer until a fixed connection of filter medium and end face plastic layer has been formed.

7 Claims, 2 Drawing Sheets

END DISK

CROSS REFERENCE TO RELATED APPLICATIONS

The present application is a divisional application of U.S. non-provisional patent application Ser. No. 12/064,674 filed Jul. 29, 2008 which received to a restriction requirement by the Office on Jul. 14, 2009. This divisional application claims the benefit of the prior U.S. nonprovisional application Ser. No. 12/064,674 under 35 USC 121. As in the prior filed U.S. nonprovisional, the present application claims the benefit under 35 USC 119 of foreign application 10 2005 040 417.0 filed in Germany on Aug. 25, 2005, and which is hereby incorporated by reference in its entirety. As in the prior filed U.S. nonprovisional, the present application is a 35 USC 371 national stage entry of PCT/EP2006/065622 filed Aug. 24, 2006 and which is hereby incorporated by reference in its entirety. The present application presents the specification and drawings of the prior U.S. non-provisional patent application Ser. No. 12/064,674 together with new claims directed to the restricted/non-elected invention of the prior US non-provisional patent application.

TECHNICAL FIELD

The invention concerns a plastic end disk for a hollow-cylindrical filter element, preferably for a liquid filter, comprising at least two plastic layers, wherein an end face plastic layer of the plastic end disk can be connected to a hollow-cylindrical zigzag shaped folded filter medium by means of a melting process of the end face plastic layer. Moreover, the invention concerns a manufacturing method for a filter element by employing such an end disk, wherein a fixed, seal-tight connection between adjacently positioned terminal edges of a zigzag-shaped folded fluid-permeable filter material and a plastic end disk is produced, wherein the plastic end disk comprises two substantially plate-shaped plastic layers.

BACKGROUND OF THE INVENTION

Such plastic end disks have the task to provide a usually circular ring-shaped surface into which a filter medium can be embedded in a seal-tight way. Moreover, the plastic end disk should have a connecting contour that is suitable for producing a seal-tight and detachable connection to a connecting element. Such an end disk is disclosed in, for example, DE 199 19 289. Here, the manufacture of a plastic end disk is disclosed that is used for a seal-tight connection to a filter medium. For this purpose, stacked plastic disks are employed that have different thermal properties so that they can be selectively heated by inductive treatment.

DE 101 06 734 discloses a method for producing a connection between a fluid-impermeable plastic material and a fluid-permeable filter material. For this purpose, the plastic end disk is plastified in the area to be connected by an infrared heat source wherein the infrared heat source must have certain predetermined technical features.

A disadvantage of the first plastic end disk is that it must contain metal particles in order to be heatable by the inductive heat source because such plastic end disks are difficult to dispose of. The plastic end disk of the second method must not contain pigments for a colored or black design of the material which pigments have great heat-absorbing properties. This can cause in case of quick and intensive heating exothermal reactions within the synthetic material resulting in destruction of the material. Even without the heat-absorbing materials within the plastic material the radiation intensity that is acting on the plastic material must not be too great because this can cause bubble formation and burns on the surface of the plastic material.

It is an object of the invention to provide a plastic end disk that can be simply and inexpensively manufactured and that enables an especially homogenous plastification in the area of the joining zone at short plastification times. This object is solved in that the end face plastic layer is substantially transparent for infrared or heat radiation and a plastic layer neighboring it is configured so as to be substantially absorbent for infrared radiation. This object is further solved in regard to the method in that in a first step the first plastic layer that is substantially transparent for infrared radiation is trans-irradiated by an infrared radiation source, wherein the infrared radiation is absorbed in the second plastic layer that is substantially absorbent for infrared radiation and wherein a portion of the second plastic layer and the first plastic layer are completely melted, in a second step the infrared radiation source is removed, in a third step the terminal edges of the filter material are pressed into the still melted area of the first plastic layer, and in a forth step the pressed-in filter material is secured in the pressed-in position until a fixed connection has been formed with the synthetic material.

SUMMARY OF THE INVENTION

The inventive plastic end disk comprises two substantially circular cylindrical plastic layers wherein an end face plastic layer of the plastic end disk can be connected to a hollow-cylindrical zigzag-shaped folded filter medium by means of a melting process of the plastic layer at the end face. The plastic layers can be glued or welded to one another, produced in a two-component method or can be simply stacked. In this connection, the plastic layer at the end face is plastified and in the plastified state is pressed onto the tips of the fold ends of the filter medium and hardened thereat. The plastic end disk can be used preferably as a liquid filter but it is also possible to use it as a gas filter. Moreover, the plastic layer at the end face is designed to be substantially transparently for infrared radiation or heat radiation and the plastic layer directly adjacent thereto is designed to be substantially absorbent for infrared radiation. When irradiating with an infrared source, the end face plastic layer is penetrated by the infrared radiation and is heated by excitation of the atoms and molecules. The major portion of the infrared radiation will however penetrate the end face plastic layer and will impinge on the boundary layer to the neighboring plastic layer where it is partially absorbed and partially reflected. The reflected infrared radiation in turn will heat the end face plastic layer from the interior. The infrared radiation proportion that impinges on the interface between the plastic layers heats the boundary layer in the area of the neighboring plastic layer. As a result of the hot boundary layer, there is furthermore heat conduction from the interior into the neighboring plastic layer as well as into the end face plastic layer. The end face plastic layer is preferably of a natural color or is colored with a light-transparent or laser-transparent pigment. With this configuration of the plastic end disk it is achieved that the hottest location of the melting process is located in the interior at the interface between the end face plastic layer and the neighboring plastic layer of the plastic end disk; in this way, the end face plastic layer is very uniformly plastified. This is of great importance for welding it to the terminal edges of the filter medium. In this way, a greater penetration depth and improved processing can be achieved so that an improved seal-tightness results. Moreover, the cycle time can be significantly reduced because the material that is substantially transparent for infra red radiation at great radiation input does have the tendency to form bubbles and the radiation proportion will be better distributed in the plastic end disk. In this way, from the beginning a greater radiation intensity can be employed in the process which leads to a reduction of the processing time. Moreover, the main heating zone is within the area of the boundary layer so that the remainder of the neighboring plastic layer remains shape-staple thus improving handling.

According to an advantageous embodiment of the invention the plastic end disk is produced by a two-component injection molding process from a thermoplastic synthetic material. In this connection, preferably first the plastic layer that absorbs infrared radiation is injection molded and, subsequently, the end face plastic layer that is substantially transparent for infrared radiation is injection molded onto the absorbing layer. This manufacturing process is sufficiently perfected and provides great advantages in regard to process safety.

In this connection. it is advantageous when the end face plastic layer is comprised of a substantially glass fiber-free polyamide and the neighboring plastic layer having absorbing properties is comprised of a glass fiber-reinforced polyamide to which dark heat-absorbing particles are added. As a result of the embodiment of the end face plastic layer of polyamide that is essentially free of glass fibers, the advantage results that the plastification process can be performed very uniformly and the attachment to the zigzag-shaped folded ends of the filter medium is particularly intimate. The required stability of the plastic end disk is then ensured by the embodiment of the neighboring plastic layer from glass fiber-reinforced polyamide.

According to an advantageous embodiment of the invention the end face plastic layer has at a radial end an axially projecting annular collar. The latter can be arranged at the outer radial end or the inner radial end of the end face plastic layer. The annular collar extends axially away from the filter medium and forms a sealing contour that matches a corresponding sealing counterpart. This sealing counterpart can be a central tube of the housing or of the filter element or can also be a contact socket of the housing. The sealing contour is formed as an integral part of the annular collar.

It is moreover possible that the plastic layer neighboring the end face plastic layer furthermore forms a functional element, in particular a liquid outlet. The plastic layer neighboring the end face plastic layer is the side of the plastic end disk facing away from the filter medium wherein it is possible in this way that this plastic layer also serves for centering and fixation of the filter element in a housing or forms a through opening and a thread for a discharge screw.

According to an advantageous embodiment of the invention the side of the neighboring plastic layer that faces the end face plastic layer has a surface area-enlarging relief contour. This can be, for example, in the form of an audio record contour or in the form of a circumferentially extending wave line or sawtooth line. Since the two plastic layers are produced by a two-component method, the end face plastic layer has therefore a matching surface profile. By enlarging the surface area by means of the surface area-enlarging relief contour an even better heat introduction by means of the infrared radiation into the interface between two neighboring plastic layers results so that in this way the processing time is further significantly reduced.

For producing a filter element in connection with the plastic end disk according to the invention, in a first step the first plastic layer that is essentially transparent for infrared radiation is trans-irradiated by the infrared radiation source. The infrared radiation source can be a laser or an infrared radiator. The infrared radiation penetrates the first end face plastic layer that is substantially transparent and thus impinge on the second plastic layer that is substantially absorbent for infrared radiation. At the interface between the two plastic layers a great heat above the melting temperature develops by absorption of infrared radiation so that the boundary layer begins to plastify. As a result of the radiation of infrared radiation at the boundary layer and a minimal heating of the transparent plastic layer upon trans-irradiation, said plastic layer is plastified from the interior to the exterior uniformly and homogeneously. In a second step, the infrared radiation source is removed and the adjacently positioned terminal edges of his zigzag-shaped folded fluid-permeable filter material are pressed into the still melted plastified area of the first plastic layer. This position is maintained until a fixed connection of the terminal edges of the filter material with the synthetic material in the pressed-in state is achieved. By means of the special design of the plastic end disk, it is possible to work with a high radiation intensity of the infrared radiation source so that extremely short cycle times will result.

Aside from the claims, these and further features of preferred embodiments of the invention result also from the description and the drawing wherein the individual features, taken alone or several combined in the form of sub combinations, can be realized in the embodiment of the invention or in other fields and can represent advantageous as well as independently protectable embodiments for which protection is sought herein.

BRIEF DESCRIPTION OF THE DRAWINGS

Further details of the invention are described in the drawing with the aid of schematic embodiments. It is shown in.

DESCRIPTION OF THE PREFERRED EMBODIMENTS

Figure 1:
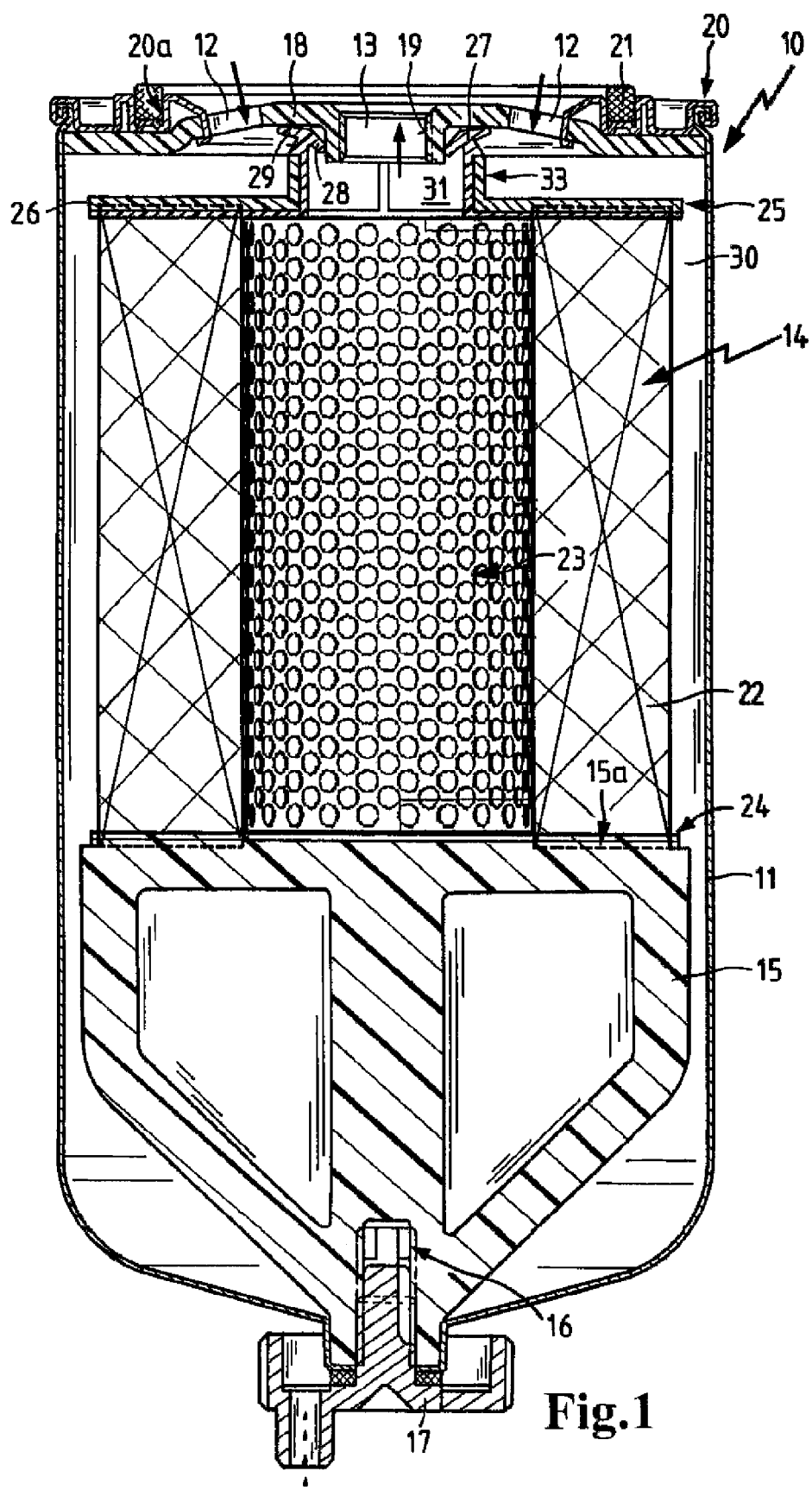
FIG. 1 a liquid filter in section view.

The FIG. 1 shows a liquid filter 10, in particular fuel filter, with a cup-shaped housing 11 provided with an intake 12 and an outlet 13. The outlet 13 is arranged centrally on the end face of the cup-shaped housing 11 and the intake 12 is arranged concentrically about the outlet 13 distributed onto several openings. In the interior of the cup-shaped housing 11a filter element 14 is arranged that separates seal-tightly an unfiltered side 30 from a filtered side 31. In the lower area of the cup-shaped housing 11 the filter element 14 is secured axially in the housing 11 by a bottom member 15. The bottom member 15 has a support for the filter element 14 as well as an inner thread 16 that provides at the bottom of the cup-shaped housing a receptacle for a drainage screw 17. When using the liquid filter 10 as a fuel filter, especially a diesel fuel filter, in the lower area of the cup-shaped housing 11 water that is heavier than fuel will collect, the collected water is drained by means of the drainage screw 17 from the cup-shaped housing 11. The cup-shaped housing 11 is closed off by a metallic cover plate 18. This cover plate 18 has a centrally arranged threaded receptacle 19 that receives a threaded socket of a counterpart, not illustrated, for example, a fuel assembly or a cylinder block. The cover plate 18 is secured to the housing wall of the cup-shaped housing 11 by a securing plate 20 wherein the securing plate 20 on the one hand is connected to the cup-shaped housing 11 by crimping in a seal-tight and non-detachable way and on the other hand secures the cover plate 18 by a fold also in a seal-tight way. In the cover plate 18 the intake and outlet openings 12, 13 of the liquid filter are arranged also. The securing plate 20 has axially outwardly a circumferential groove for receiving a seal 21 that serves for sealing the liquid filter 10 relative to the counterpart. The filter element has a hollow-cylindrically arranged preferably zig-zag-shaped folded filter medium 20 made of filter paper or a non-woven filter material or a synthetic material or a mixture of all of the above and is supported by an inwardly positioned support tube 23 against collapse. The filter element 14 is closed at the bottom by a closed lower end disk 24 that is made of a thermoplastic material that is substantially transparent for infrared radiation. The end disk 24 is welded by an infrared welding method to the bottom member 15 that is substantially absorbent for infrared radiation. It is however also conceivable to provide a nitrile rubber end disk that rests on the bottom member 15 or is connected to it by an adhesive. On the opposite end face the filter element 14 has an open end disk 25 which has an end disk part 26 and a sealing part 27. The sealing part 27 is in the form of an annular collar 33 that axially extends away from the filter medium. It ends in a T-shaped member wherein one end of the T member provides a radial seal 28 relative to a vertical extending circumferential edge of the cover plate 18 and the opposite end of the T member of the sealing part 27 rests axially against a horizontal contact surface of the cover plate 18. In this way, on the one hand an axial sealing action results and on the other hand an improved radial sealing action at the radial seal 28, caused by means of a certain axial compression, as a result of a minimal rotation of the T shaped leg of the annular collar 33.

Figure 2:
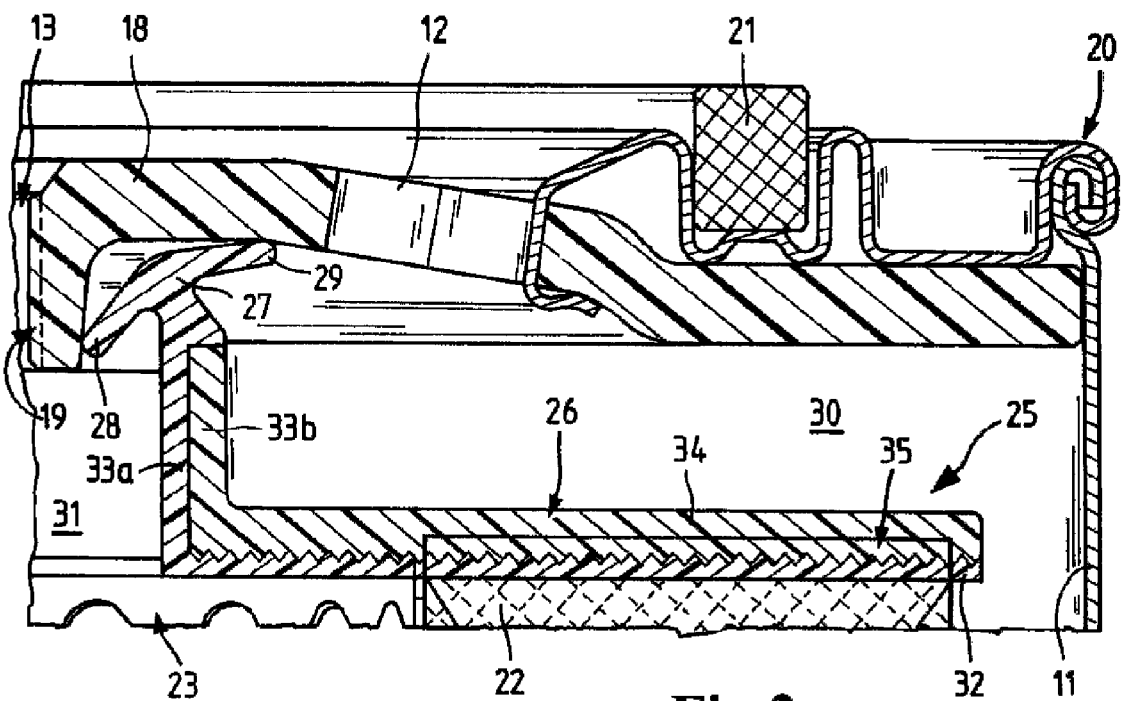
FIG. 2 a detail view of the plastic end disk in a detail illustration.

FIG. 2 shows a detail in the area of the plastic end disk. Components that correspond to those of the preceding figure are identified with same reference numerals. The two-layer configuration of the plastic end disk 25 can be seen clearly. The end face facing the filter medium 22 has a plastic layer 32 that is transparent for infrared radiation which completely receives the filter medium 22. The transparent plastic layer 32 has in the radial inner area an annular collar 33*a* that continues as a sealing part 27. An absorbent plastic layer 34 is connected to the transparent plastic layer 32 and has at its radial inner end also an annular collar 33*b* that is shaped so as to match the shape of the annular collar 33*a* and supports it in a shape-stabilizing way. On the interface between the transparent plastic layer 32 and the absorbent plastic layer 34 there is a sawtooth contour 35. It serves for providing better absorption and reflection of the infrared radiation passing through the transparent plastic layer 32 so that the plastification process in the area of the interface happens faster.

The invention claimed is:

1. A method of providing a fixed, seal-tight connection between a plastic end disk and a filter medium, comprising:
   providing said end disk having two neighboring plate-shaped layers, said end disk having on an end face side an infrared radiation (IR) transparent layer and on an opposing side an IR absorbent layer with an internal interface surface defined between said layers;
   providing said filter medium having terminal edges to be connected to said end disk at said end face side by said method;
   trans-irradiating said end disk with an IR radiation source delivering IR radiation onto said IR transparent layer from said end face side of said end disk;
   transmitting said IR radiation through said IR transparent layer to said internal interface surface of said IR absorbent layer;
   heating said IR absorbing layer by said transmitted IR radiation transmitted through said IR transparent layer;
   indirectly heating said end face IR transparent layer by heat conducted from said IR absorbing layer;
   melting said IR transparent layer by said indirect heating, beginning at said interface surface of said IR transparent layer, said melting proceeding outwards to said end face side of said IR transparent layer of said end disk;
   continuing said trans-irradiating step until a connecting area of said IR transparent layer is completely melted;
   ceasing the practice of said trans-irradiating step;
   pressing said terminal edges of said filter medium into said melted connecting area of said IR transparent layer at said end face side of said end disk; and
   maintaining said filter medium in said pressed in position on said end disk while said IR transparent layer cools until a fixed connection between said terminal edges and said end disk is achieved, wherein said end face side of said end disk is fused to said terminal edges of said filter medium.

2. The method according to claim 1, wherein in the providing said end disk step, said internal interface surface defined between said IR transparent and said IR absorptive layer interior to said end disk includes a surface area-enlarging relief contour, said relief contour providing better absorption of IR radiation for faster melting.

3. The method according to claim 2, wherein in the providing said end disk step, said surface area-enlarging relief contour is an audio record contour of spaced grooves.

4. The method according to claim 2, wherein in the providing said end disk step, said surface area-enlarging relief contour is a circumferentially extending wave line.

5. The method according to claim 2, wherein in the providing said end disk step, said surface area-enlarging relief contour is a sawtooth line.

6. The method according to claim 1, wherein in the providing said end disk step, said IR absorbent layer includes an axially outwardly projecting collar, said collar forming a sealing contour relative to a matching sealing counterpart.

7. The method according to claim 1, wherein in the providing said end disk step, said annular collar is positioned at an inner radial portion of said IR absorbent layer of said end disk.

* * * * *